US007574929B2

(12) United States Patent
Telimaa et al.

(10) Patent No.: US 7,574,929 B2
(45) Date of Patent: Aug. 18, 2009

(54) CONTROLLABLE PIPETTE

(75) Inventors: Juha Telimaa, Jarvenpaa (FI); Mikael Lind, Helsinki (FI)

(73) Assignee: Thermo Electron OY, Vantaa (FI)

( * ) Notice: Subject to any disclaimer, the term of this patent is extended or adjusted under 35 U.S.C. 154(b) by 116 days.

(21) Appl. No.: 10/590,381

(22) PCT Filed: Feb. 24, 2005

(86) PCT No.: PCT/FI2005/000115

§ 371 (c)(1),
(2), (4) Date: Jun. 25, 2007

(87) PCT Pub. No.: WO2005/079987

PCT Pub. Date: Sep. 1, 2005

(65) Prior Publication Data

US 2007/0277627 A1 Dec. 6, 2007

(30) Foreign Application Priority Data

Feb. 25, 2004 (FI) .................................. 20040289

(51) Int. Cl.
*G01N 1/14* (2006.01)

(52) U.S. Cl. .................................................. 73/864.16

(58) Field of Classification Search .................. 73/864, 73/863.01, 864.02, 864.16–864.18, 864.24; 422/100

See application file for complete search history.

(56) References Cited

U.S. PATENT DOCUMENTS

| | | | | |
|---|---|---|---|---|
| 4,671,123 | A | 6/1987 | Magnussen, Jr. et al. . | 73/864.16 |
| 4,821,586 | A * | 4/1989 | Scordato et al. .......... | 73/864.18 |
| 4,905,526 | A * | 3/1990 | Magnussen et al. ...... | 73/864.18 |
| 6,254,832 | B1 | 7/2001 | Rainin et al. ................ | 422/100 |
| 2002/0005075 | A1 | 1/2002 | Kriz et al. ................ | 73/864.18 |

OTHER PUBLICATIONS

Product Catalogue 2001-2002, Thermo Labsystems, "Finnpipette BioControl", six pages.
International Search Report mailed Aug. 2, 2005 in PCT/FI2005/000115.

* cited by examiner

*Primary Examiner*—Hezron Williams
*Assistant Examiner*—Tamiko D Bellamy
(74) *Attorney, Agent, or Firm*—Nixon & Vanderhye P.C.

(57) ABSTRACT

The invention relates to a controllable pipette comprising a piston actuated by a motor, a control system allowing actuation of the piston according to a given pipetting function consisting of several steps, setting keys (7, 8) for selecting the desired pipetting function, a switch (1), which activates the function steps when depressed, and a display (3). The control system comprises a change function, whose activation enables a change of the selected function in the process of its operation. When the change function can be activated, this is indicated on the display and it can be activated by depressing a given setting key.

5 Claims, 4 Drawing Sheets

CONTROLLABLE PIPETTE

Figure 1:
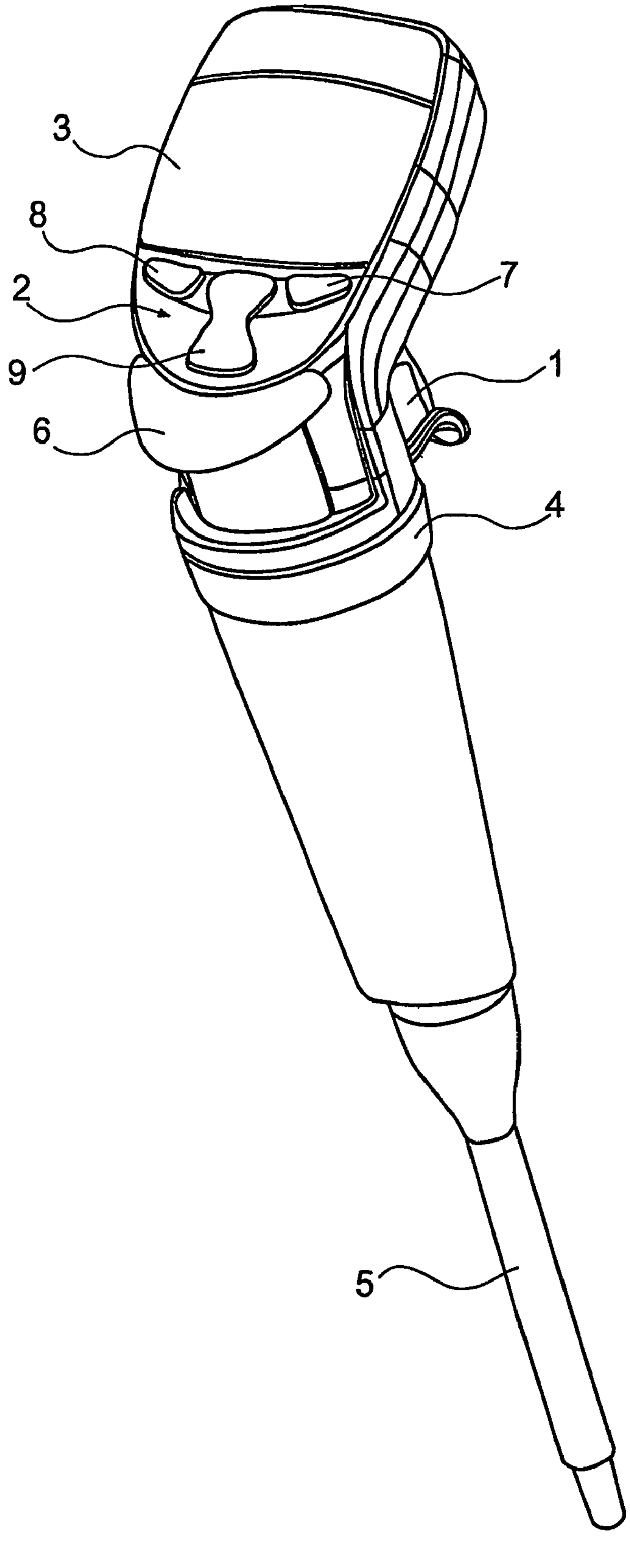

This application is the US national phase of international application PCT/FI2005/000115 filed 24 Feb. 2005 which designated the U.S. and claims benefit of FI 20040289, dated 25 Feb. 2004, the entire content of which is hereby incorporated by reference.

FIELD OF TECHNOLOGY

The invention relates to an electronic pipette intended for use in the dosage of liquids and comprising a motor-driven piston, a control system, and a user interface associated with the control system. The invention relates specifically to the operations of the control system and the user interface.

TECHNOLOGICAL BACKGROUND

Pipettes used for liquid dosage in laboratories comprise a piston movable in a cylinder and serving to aspire liquid into and to dispense liquid from a tip joined to the set of a cylinder according to a selected pipetting function. The liquid volume is usually adjustable. There are also electronic pipettes whose piston is actuated by means of an electric motor and an associated control system. Electronic pipettes have a control system and an associated user interface for setting i.a. the volume and the other necessary pipette functions and for giving commands for performing operations. The user interface has the necessary keys for this. The user interface also comprises a display, by means of which i.a. the volume and any other necessary data can be displayed. The display can also show menus allowing selection of functions and input of settings by means of the keys. When the desired function has been selected and the volume and other settings have been entered, depression of the operating switch automatically carries out the following step of the function until the entire function has been completed.

The pipetting functions comprise e.g. direct, reverse, step and mixed pipetting. Direct pipetting involves aspiration of a desired volume into the pipette and discharge of the volume. Reverse pipetting function involves aspiration of a volume greater than the one desired into the pipette, with the desired volume being subsequently dispensed. Step pipetting involves aspiration of a volume into the pipette, the volume being subsequently dispensed in a plurality of minor portions. Mixed pipetting comprises discharge of liquid into a receptacle containing a liquid, the pipette tip being located under the liquid surface and the piston performing several reciprocating movements during the discharge in order to mix the liquids in the receptacle.

Such a pipette is e.g. Finnpipette® BioControl (manufacturer Thermo Electron, Finland).

Some pipettes also have a separate button for interrupting the step function. When this button is depressed during dosing, the entire liquid amount in the pipette is dispensed in one single pass (i.e. not in minor portions as in step pipetting). In some pipettes, the step function can be interrupted by depressing the operating switch long enough.

SUMMARY OF THE INVENTION

An electronic controllable pipette and its control system as defined in the independent claims have now been invented. The dependent claims define some embodiments of the invention.

In accordance with the invention, at least some pipetting functions of the pipette can be changed in the process of its operation by depressing a specific setting key. The function generated by this key will hence change in the course of the pipetting function. When a function can be changed, the change option is indicated on the display. The function can thus be interrupted by text control.

Changes of the pipetting function may include e.g. cancelling, switching to another function, or adding a supplementary function.

In accordance with the invention, simple and straightforward text control allows more versatile pipetting potential.

DRAWINGS

Figure 2:
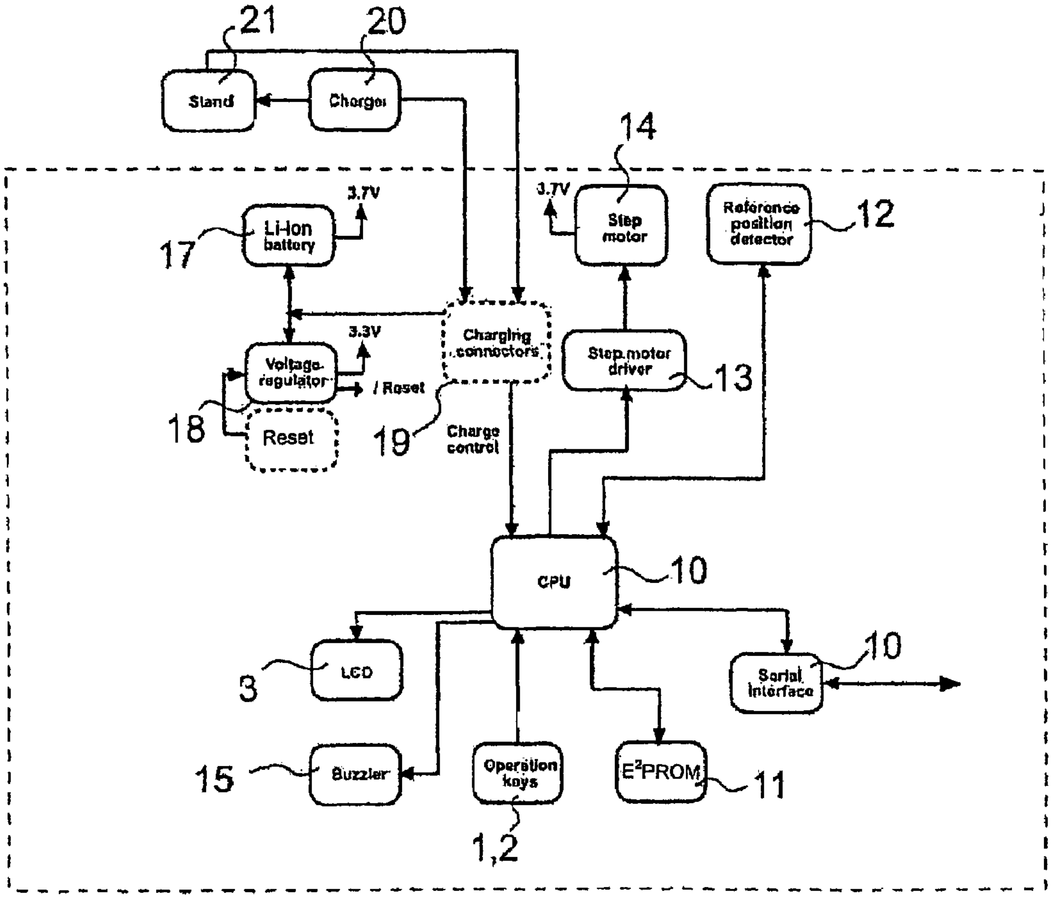
Figure 3:
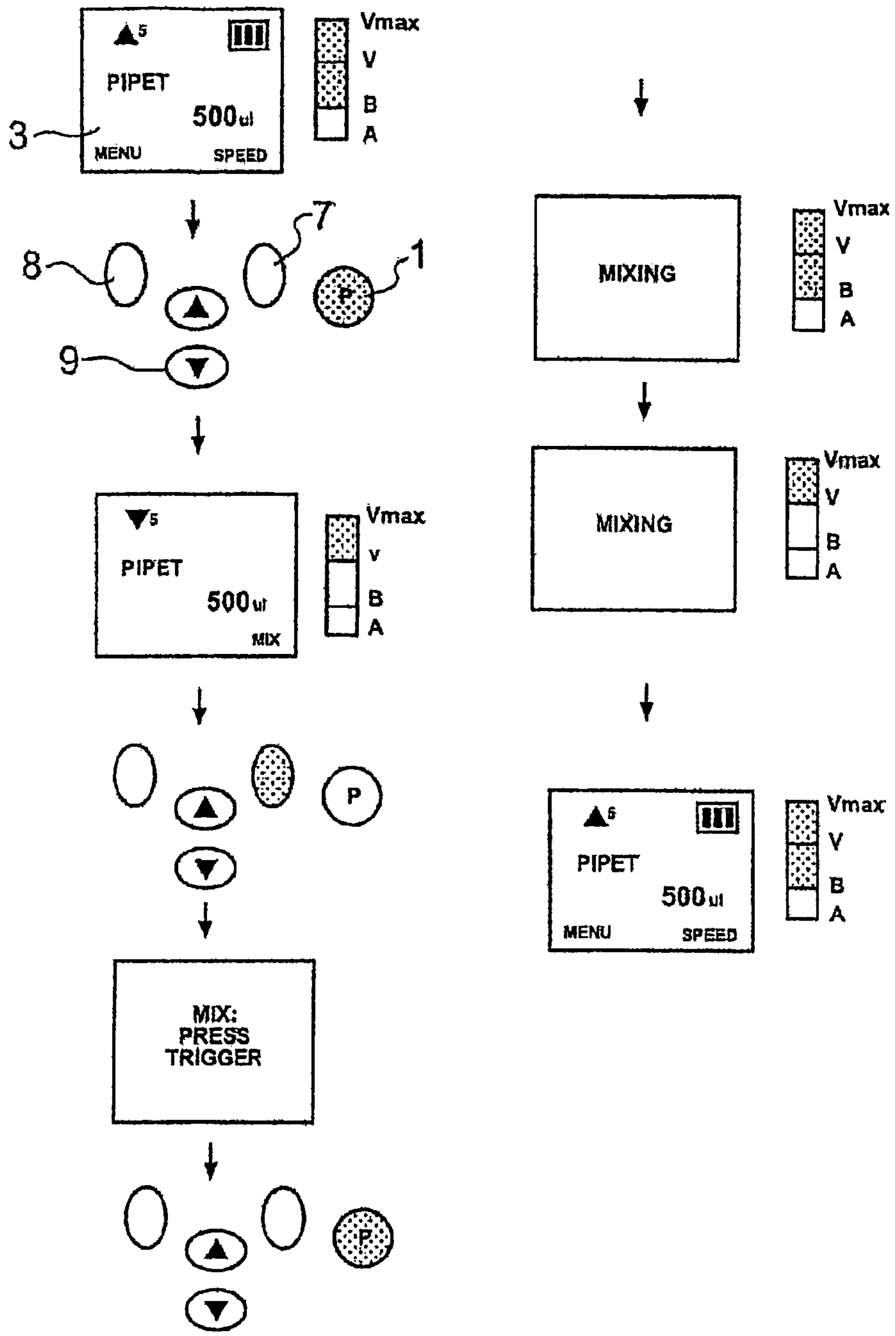
Figure 4:
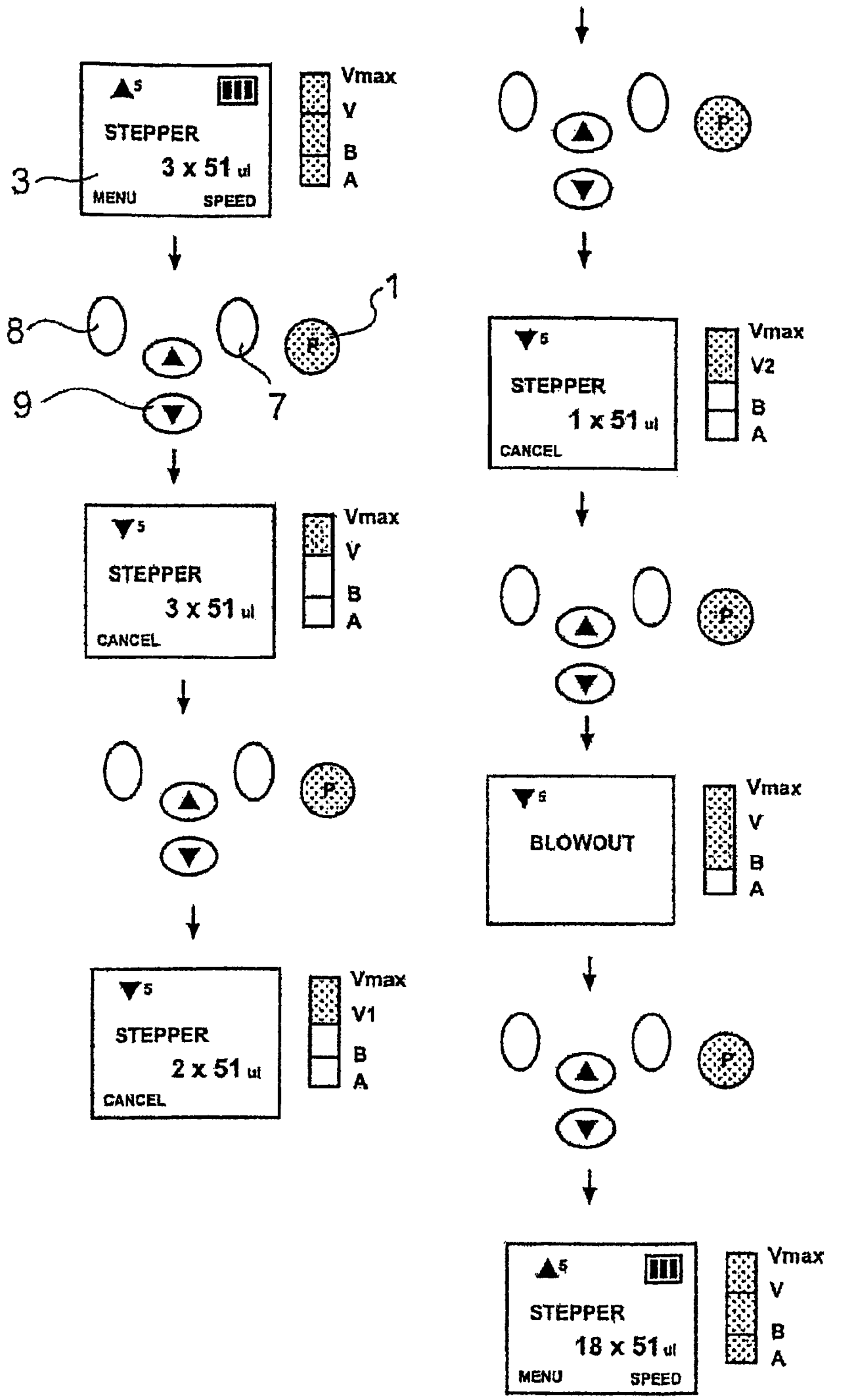

The accompanying drawings pertain to the written description of the invention and relate to the following detailed description of the invention. In the drawings FIG. 1 shows a pipette of the invention FIG. 2 shows the operation of the pipette as a chart FIG. 3 illustrates how mixing can be combined with basic pipetting in the course of operation FIG. 4 illustrates how a step function can be interrupted in the course of operation.

DETAILED DESCRIPTION OF THE INVENTION

In the electronic pipette of the invention, the piston is actuated by a motor. The pipette control system comprises a user interface with setting keys, an operating switch and a display.

The display shows e.g. the volume and other necessary data. The display also shows menus allowing data input in the control system by means of the setting keys, the data comprising e.g. selecting the desired pipetting function and the settings used for this.

Each pipetting function consists of successive steps forming a given sequence. At the end of a step, the function always stops and resumes by a command, usually depression of the operating switch. The various functions may include e.g. the following:

- Direct pipetting, involving aspiration of a desired volume to be subsequently dispensed.
- Reverse pipetting, involving aspiration of a volume greater than a desired volume and dispensing the desired volume.
- Stepping pipetting, involving dispensing an aspirated volume in a plurality of minor portions of desired sizes.
- A diluting function, involving aspiration of several liquids into the pipette.
- A direct pipetting and mixing function, during which the pipette tip is kept under the liquid surface while liquid is dispensed and several successive aspiration and dispensing movements are performed with the piston.
- A direct pipetting and calculation function, involving calculation of the pipetting passes.
- An aspiration function, allowing several successive volumes to be aspirated into the pipette.
- A manual function, involving aspiration of liquid into the pipette as long as the control button is depressed. The function can be used e.g. for measuring a volume.

When the desired volume has been selected and the volume and other settings have been entered, the function is started by depressing the operating switch.

In accordance with the invention, a selected function can be interrupted in the course of operation by depressing a given setting key. When the function can be changed, the display indicates the change option and the key by which the change is activated. The change is hence performed under text control. The indication is preferably shown as a text at this particular setting key. In other words, the function related to the setting key changes in the process of operation.

Changes of the function may include e.g. cancelling, switching to another function, or adding a supplementary function.

In other respects, the pipette mechanism and the control system may operate on the same principle as e.g. those disclosed in FI 96007 (corresponding to EP 576967).

Some embodiments of the invention are exemplified below.

FIG. 1 shows a pipette driven with an electric motor. The user interface of the control system comprises an operating switch 1, a setting keyboard 2 and a display 3.

The operating switch 1 has been disposed in a wheel 4 rotatable relative to the body. This allows the user to adjust the position of the operating switch. A push-button 6 of the tip removal sleeve 5 is provided in the pipette body on the opposite side of the switch. The tip is removed by manual force. It has preferably been relieved by a lever mechanism, especially by such in which the tip remover is urged to move by means of a wheel relative to the pipette body, as described in FI 92374 (corresponding e.g. to EP 566939).

The display 3 is disposed at the top of the pipette, in a position upwardly oblique away from the push-button 6 of the tip removal sleeve on the upper surface of a projection. A power source is provided within the projection. The setting keyboard 2 is disposed on the upper surface of the projection, at its end on the side of the body. The display shows necessary information about the settings used each time, such as e.g. the pipette volume and function in use and the current function step. The display also shows different menus in each situation, allowing the settings to be changed.

The pipette settings can be changed by means of the setting keyboard 2. The setting keys are: a right-hand selection key 7, a left-hand selection key 8 and a bifunctional scanning key (arrow keys) 9. The current is switched on by depression of any key. Depending on the setting step, the selection keys allow the user to move forwards or backwards in a menu hierarchy or to start using a selected function. Depending on the setting step, the scanning key allows the user to move to an option on the display or to change characters on the display (such as numbers or writing). The selection function enables the user to move to the desired location in the menu and to confirm it by means of the selection keys. The change function scans a character string, of which the desired character is selected. The characters may act on a setting of the function (e.g. volume, piston stroke speed), or they may be confined to giving information.

FIG. 2 is a schematic view of the pipette functions. The core of the control system is a central processing unit (CPU) 10 connected with a memory 11. The CPU is used by means of the function keys, i.e. the operating switch 1 and the setting keyboard 2. The CPU is informed of the piston position by a position sensor 12. The CPU gives the commands needed for actuating the piston to a driver 13, which controls a step motor 14. The functions are indicated on the display (liquid crystal display LCD) 3. Some functions are indicated with acoustic signals by means of a buzzer 15. In addition, the CPU is connected to a serial interface 16 allowing data input into or output from the CPU. A chargeable 3.7 V Li ion battery 17 acts as the voltage source. The battery comprises a voltage control and reactivating circuit 18. The battery is charged over terminals 19 using a charger 20 in a stand 21. The charging is also controlled by the CPU.

FIG. 3 exemplifies how to combine mixing with basic pipetting in the course of operation. The user has chosen the PIPET function (direct pipetting) and set the volume (500 μl in the figure) through the MENU in the main menu by using selection keys 7 and 8 and scan key 9. The piston stroke speed (5 in this case) has been set through the SPEED menu, the speed showing in the left upper corner of the display 3. In the left upper corner there is also a direction arrow indicating whether the piston is moving upwardly or downwardly in the following step. To the right in the scheme there is a bar illustrating the piston position. Liquid aspiration is started in position B and the piston is moved upwardly to the desired volume V (maximum volume Vmax). In direct pipetting, the piston is driven underneath the basic position to position A during liquid discharge. In reverse pipetting liquid is aspirated starting from position A. In the mixing function, liquid is dispensed while performing reciprocating movements between positions B and V.

In the first step of FIG. 3, the piston is in the basic position B, and when the operating switch 1 (P) is now depressed, the piston moves into position V. Then the operation of the selection keys also changes temporarily. The left-hand key is turned off and a text MIX appears at the right-hand key. When the right-hand selection key is now depressed, a mixing function can be additionally combined with liquid discharge. When the mixing function is thus activated, the following step, i.e. liquid discharge, is activated by the operating switch, the piston performing stirring movements as long as the switch is depressed.

In the first step of FIG. 4, the user has selected the function STEPPER (step function) using the selection keys 7 and 8 and the scan key 9 in the MENU and he has set the STEPPER function to dose 3 doses of 51 μl each. In the initial position, the piston is in the lowermost position A. During liquid aspiration, the piston moves to position V, the distance BV equaling the total volume to be dosed.

The function is activated by depressing operating switch 1 (P), with the piston moving to position V. At the same time the display 3 changes, with a text CANCEL appearing at the left-hand selection key 8. If the user now presses this key, the step function is interrupted, and if he presses the operating switch, the piston moves to position A in one go, thus dispensing the liquid in its totality.

The invention claimed is:

1. An electronic controllable pipette comprising
a piston actuated in a cylinder by a motor,
a control system enabling the piston to be moved under a given pipetting function consisting of several steps,
setting keys for selecting the desired pipetting function and the related settings,
a switch activating the function steps when depressed, and
a display, wherein
the control system comprises a change function, the activation of the change function allowing a selected function to be changed in the course of its operation such that when the change function is activated, the operation of a given setting key responsively changes to a changed operation, the changed operation of the given setting key being shown on the display so that the changed operation can be activated by depressing the given setting key.

2. A pipette as defined in claim 1, in which the change function comprises cancelling a selected pipetting function, switching from the selected pipetting function to another, or combining an additional function with the selected pipetting function.

3. A pipette as defined in claim 1, in which the setting keys include at least one selection key which, when depressed, allows a pipetting function or setting indicated on the display to be selected for use, and at least one other selection key which, when depressed, enables the activation of the change function.

4. A control system for controlling an electronic pipette which comprises a piston actuated in a cylinder by a motor, the piston being movable by means of the control system according to a given pipetting function consisting of several steps, setting keys for selecting the desired pipetting function and the related settings, a switch which activates the function steps when depressed, and a display (3), wherein the control system comprises a change function, the activation of the change function allowing a selected function to be changed in the course of its operation such that when the change function is activated, the operation of a given setting key responsively changes to a changed operation, the changed operation of the given setting key being shown on the display so that the changed operation can be activated by depressing the given setting key.

5. A pipette as defined in claim 2, in which the setting keys include at least one selection key which, when depressed, allows a pipetting function or setting indicated on the display to be selected for use, and at least one other selection key which, when depressed, enables the activation of the change function.

* * * * *